Sept. 21, 1965   H. L. JAMESON   3,206,981
SAMPLING MECHANISM
Filed Sept. 23, 1963
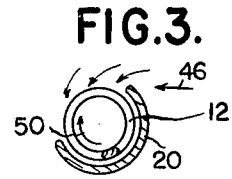
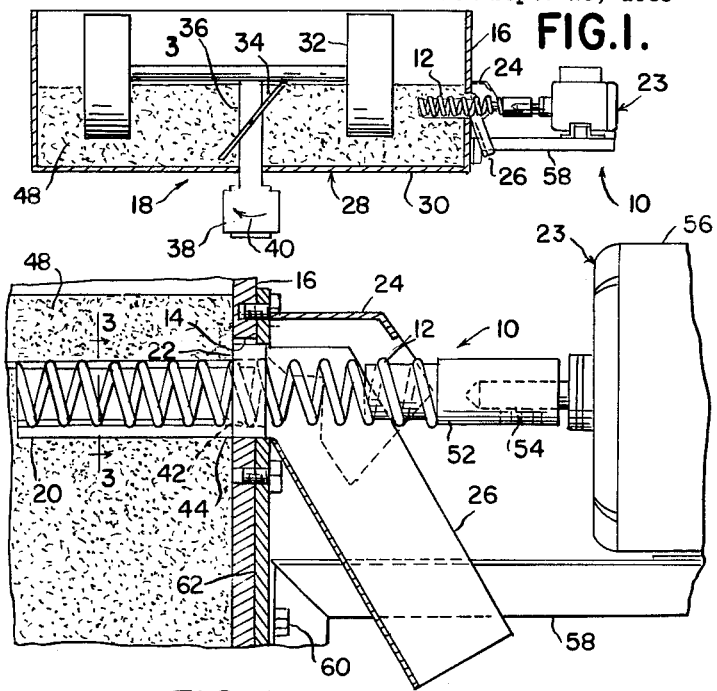
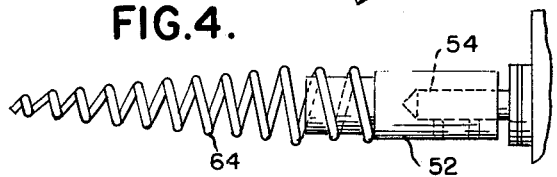
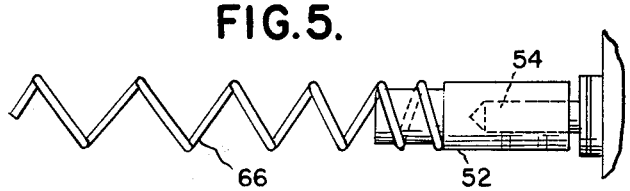
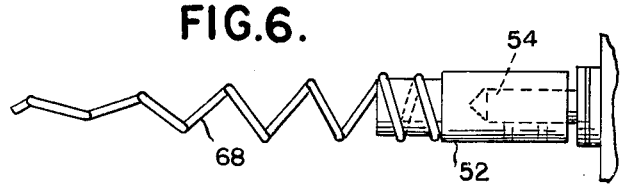
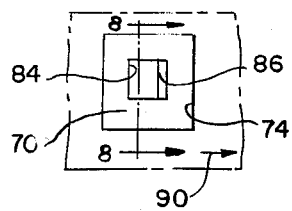
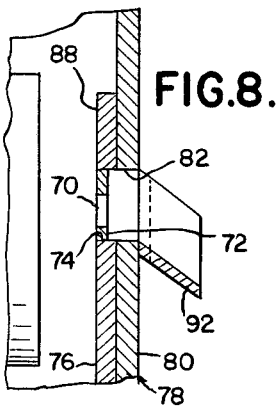
INVENTOR.
HOWARD L. JAMESON
BY Whittemore,
Hulbert & Belknap
ATTORNEYS

United States Patent Office 3,206,981
Patented Sept. 21, 1965

3,206,981
SAMPLING MECHANISM
Howard L. Jameson, Livonia, Mich., assignor to Harry W.
Dietert Co., Detroit, Mich., a corporation of Michigan
Filed Sept. 23, 1963, Ser. No. 310,657
7 Claims. (Cl. 73—421)

This application is a continuation-in-part of patent application Serial No. 208,442 filed July 9, 1962.

The present invention relates to granular material conditioning apparatus and refers more specifically to structure for feeding a continuous sample of granular material from a container.

In the past, structure for feeding a continuous sample of granular material such as foundry sand from a container such as a mill in which the granular material is conditioned has been deficient in that the sample of granular material withdrawn from the container has not been uniform wherein in fact a continuous sample has been provided. Where a uniform, continuous sample of granular material has been provided in the past, the structure for providing the sample of granular material has been unduly complicated, and thus unnecessarily expensive. Further, the prior relatively stiff structures for withdrawing a continuous sample of granular material from a container have been subject to excessive jamming and breaking.

It is, therefore, one of the objects of the present invention to provide improved structure for feeding a continuous sample of granular material from a container.

Another object is to provide structure for feeding a continuous sample of granular material from a container comprising an opening in the container, a helical member inserted in the container through the opening and means for rotating the helical member.

Another object is to provide structure as set forth above and further including means for moving the granular material in the container toward one side of the helical member and a guard positioned about the helical member on the side of the helical member toward which the granular material is moved.

Another object is to provide structure as set forth above wherein the convolutions of the helical member within the container are increased in diameter outwardly of the container.

Another object is to provide structure as set forth above wherein the convolutions of the helical member within the container are spaced axially closer together outwardly of the container.

Another object of the present invention is to provide structure as set forth above wherein the guard extends beneath the portion of the helical member within the mill for substantially the entire length thereof.

Another object is to provide structure for feeding a continuous sample of granular material from a container comprising an opening in a wall of the container, and a plate positioned within the opening having a thickness substantially less than the thickness of the container wall having a second opening therethrough.

Another object is to provide sample feeding structure as set forth above wherein the second opening is substantially rectanguar and the plate is provided with a bevel edge increasing the area of the second opening outwardly of the container wall, which bevel edge is on the side of the second opening toward which granular material in the container is moved.

Another object is to provide sample feeding structure which is simple in construction, economical to manufacture, and efficient in use.

Other objects and features of the invention will become apparent as the description proceeds, especially when taken in conjunction with the accompanying drawings illustrating a preferred embodiment of the invention, wherein:

FIGURE 1 is an elevational view, partly in section, of a granular material conditioning mill, including sample feeding structure constructed in accordance with the invention operably associated therewith.

FIGURE 2 is an enlarged elevation view, partly in section, of the sample feeding structure illustrated in FIGURE 1.

FIGURE 3 is a section view of a portion of the sample feeding structure illustrated in FIGURE 2 taken substantially on the line 3—3 of FIGURE 2.

FIGURE 4 is an elevation view of a modified helical member for use with the sample feeding structure illustrated in FIGURES 1 through 3.

FIGURE 5 is an elevation view of another modified helical member for use with the sample feeding structure illustrated in FIGURES 1 through 3.

FIGURE 6 is an elevation view of still another modified helical member for use with the sample feeding structure illustrated in FIGURES 1 through 3.

FIGURE 7 is an elevation view of another embodiment of sample feeding structure constructed in accordance with the invention.

FIGURE 8 is a section view of the sample feed structure illustrated in FIGURE 7 taken substantially on the line 8—8 in FIGURE 7.

With particular reference to FIGURES 1 through 6 of the drawings, one embodiment of the present invention will now be considered in detail.

The sample feeding structure 10 illustrated best in FIGURE 2 comprises a helical member 12 extending through an opening 42 in plate 22 secured in an opening 14 in the wall 16 of the mill 18 for conditioning granular material.

Motor means 23 are provided to rotate the helical member 12. The sample feeding structure 10 further includes the guard 20 secured to the plate 22, which guard extends into the mill 18 along one side of the helical member 12. The guard 20 functions to prevent damage to the helical member due to granular material moving toward the helical member on mulling of the granular material in the mill 18.

Cover member 24 and sample discharge chute 26 complete the sample feeding structure 10.

In operation, on rotation of the helical member 12, granular material within the mill 18 which passes over the top of guard 20 and falls through the convolutions of the helical member 12, is withdrawn from the container through the opening 14 and is deposited in the chute 26.

More specifically, the mill includes a container 28 having the cylindrical vertical wall 16 and a bottom wall 30. The rollers 32 and the scrapers 34 are set at right angles to each other in the mill 18 on shaft 36. Shaft 36 extends through the bottom 30 of the container 28 and is connected to motor means 38 for rotation thereby in the direction indicated by the arrow 40.

In conditioning of granular material, the granular material is fed into the mill 18 and an additive such as water or a bonding agent such as wood flour is added thereto, and this mixture is mulled by rotation of the scrapers and rollers to produce granular material having desired physical properties. During conditioning it is desirable to continually check the physical properties of the granular material and to control the conditioning cycle in accordance therewith.

Continued checking of the physical properties of the granular material within the mill requires that a sample of granular material is continuously removed from the mill. Preferably this sample of granular material is fed from the mill uniformly. The sample feeding structure 10 performs this function.

The plate 22 of the sample feeding structure is secured in opening 14 in the wall 16 of the container 28. Plate 22 may be secured in opening 14 by convenient means such as welding, or it may be held in by mechanical connection to the container 28 such as threads or bolts (not shown). Plate 22 includes the opening 42 extending therethrough through which the helical member 12 extends into the container 28.

The guard 20 is an elongated member which is arcuate in cross section as shown best in FIGURE 3. Guard 20 is secured at end 44 to the plate 22 by convenient means such as welding. It will be particularly noted that the guard 20 surrounds one side, and the bottom of the helical member 12.

In operation, with the rollers 32 in the mill 18 rotating in the direction indicated by arrow 40, granular material within the mill will be moved toward guard 20 in the direction of arrow 46. The granular material 48 will thus spill over the top of guard 20 and through the convolutions of the helical member 12. Granular material 48 is moved radially outwardly of the container 18 on rotation of the helical member 12 by motor means 22.

The radial movement of the granular material by the helical member 12 is improved by rotating the helical member 12 in a clockwise direction as indicated by the arrow 50 in FIGURE 3 so that the granular material spilling over the top of the guard 20 is urged toward the guard 20 rather than over the guard 20 as would be the case if the helical member 12 were rotated in a counterclockwise direction.

As best shown in FIGURE 2, the helical member 12 is supported on shaft 52 for rotation therewith. Shaft 52 is part of motor means 23 and is fixedly mounted on the output shaft 54 of electric motor 56 for rotation therewith. Motor 56 is mounted on bracket 58 secured to the mill 18 by convenient means such as the bolts 60 and reinforcing plate 62.

The cover 24 of the sample feeding structure 10 is also secured to the mill 18 by convenient means such as bolts (not shown), securing it to the container reinforcing plate 62. The chute 26 into which the granular material passing through the opening 42 in plate 22 on rotation of the helical member 12 falls is similarly secured to the container 18.

The helical member 12 of the sample feeding structure 10 which is of linear resilient material such as spring steel to prevent jamming and breaking thereof in use may be modified as illustrated in FIGURES 4, 5, and 6 to improve the efficiency thereof where desired.

Thus, the helical member illustrated in FIGURE 4 is provided with convolutions which diminish in diameter toward the end thereof positioned inwardly of the container 28.

The modified helical member 66 illustrated in FIGURE 5 differs from the helical member 12 in that the axial dimension between the convolutions thereof is progressively greater inwardly of the container 28.

The modified helical member 68 includes the structure of the helical member 64 and the helical member 66 in that the convolutions thereof are both progressively larger in diameter outwardly of the container 28 and are axially spaced closer together radially outwardly of the container 28.

In use, the modified helical members 64, 66, and 68 decrease the possibiltiy of jamming the helical member at the inner end thereof and produce a more uniform flow of granular material along the guard 20 toward the opening 42 in the plate 22. In addition, the strength of the helical members 64, 66 and 68 is increased outwardly of the mill 18 with the modified structures where added strength is necessary. The guard 20 could of course be shaped to conform to the tapered helical members.

The sample feeding structure 70 illustrated in FIGURES 7 and 8 includes the plate 72 positioned in the opening 74 in the plate 76 secured in the mill container 78 in surface-to-surface contact with the side wall 80 thereof. The opening 74 is aligned with the opening 82 in the side wall 80 of the mill container 78. The plate 70, it will be particularly noted, is approximately one fourth of the total thickness of the plate 76 and the side wall 80 of the mill container 78.

The plate 72 is provided with a rectangular opening 84 extending therethrough centrally thereof. The side 86 of the opening 84 is beveled to increase the area of the opening 84 outwardly of the mill container 78. The side 86 of the opening 84 is, as shown best in FIGURE 7, on the side of opening toward which the granular material 88 in the mill container 78 is moved as indicated by arrow 90 in FIGURE 8.

With the plate 72 substantially thinner than the total thickness of the plate 76 and the side wall 80 of the mill container 78, it has been found that granular material from the mill container 78 is fed substantially uniformly through the opening 84 to the discharge chute 92. With thicker plates 72, the feeding of a sample of granular material from the mill container 78 on mulling of the granular material as in mill 18 is extremely unpredictable if not impossible. The bevel edge 86 of the opening 84 has been found to further materially increase the flow of a sample of granular material from the mill container 78 on mulling thereof.

While two embodiments of the invention and modifications thereof have been disclosed in detail herein, it will be understood that other embodiments and modifications are contemplated. It is the intent to include all modifications and embodiments as are defined by the appended claims within the scope of the invention.

What I claim as my invention is:

1. A container for granular material having a side wall, said container having an opening through the side wall below the normal level of granular material therein, means within the container for moving the granular material in the container past the opening through the side in one transverse direction with respect to said opening and sample feeding structure including a helically wound member of small diameter resilient material inserted through the opening through the side of the container into the granular material therein and means for rotating the helical member to withdraw a substantially constant, uniform sample of granular material from the container through the opening.

2. Structure as set forth in claim 1 and further including a guard positioned over only the bottom and the side of the helical member toward which granular material is moved over substantially the entire length of the helical member within the container secured to the container about the periphery of the opening therethrough.

3. Structure as set forth in claim 2 wherein the means for rotating the helical member rotates in a direction to move the top of the helical member toward the guard at the side of the helical member toward which the granular material is moved.

4. Structure as set forth in claim 2 wherein the convolutions of the helical member are progressively smaller in diameter inwardly of the container.

5. Structure as set forth in claim 2 wherein the convolutions of the helical member are spaced progressively closer together outwardly of the container.

6. Structure as set forth in claim 2 wherein the convolutions of the helical member are of progressively smaller diameter and are spaced apart a greater distance inwardly of the container.

7. Structure for removing a substantially constant sample of granular material from granular material conditioning apparatus comprising a cylindrical container for receiving granular material to be conditioned by addition of moisture and additives thereto, muller wheels positioned within the container, means for moving the muller wheels within the container on a circular path having a diameter smaller than the diameter of the container about an axis concentric with the axis of generation of the container, scrapers positioned within the container angularly separated from the muller wheels and connected thereto for movement therewith to mix granular material in the container, said container being provided with an opening in the side thereof below the normal height of granular material within the container, a helically wound member of small diameter resilient material inserted in the opening through the side of the container into the granular material therein radially outwardly of the container with respect to the muller wheels and scrapers, said helical member having convolutions which are of progressively smaller diameter and are spaced apart axially of the helical member a greater distance radially inwardly of the container, a semi-cylindrical guard for the helical member positioned on the side of the helical member toward which the scrapers and rollers advance on movement thereof within the container and on the bottom of the helical member and connected to the container on the interior thereof about the opening therethrough and means for rotating the helical member to move the top of the helical member toward the top of the guard therefor.

References Cited by the Examiner
UNITED STATES PATENTS

| | | | |
|---|---|---|---|
| 80,008 | 7/68 | Potter | 241—203 |
| 351,014 | 10/86 | Wissler | 198—213 |
| 644,876 | 3/00 | Shelvin | 175—384 |
| 1,962,150 | 6/34 | Mohler et al. | 198—213 X |
| 2,517,073 | 8/50 | Alvarez | 198—213 X |
| 2,570,223 | 10/51 | Everett et al. | 241—203 X |
| 2,875,615 | 3/59 | Ulvin | 73—425 |
| 3,060,746 | 10/62 | Gompper | 73—422 |
| 3,105,586 | 10/63 | Carew | 222—412 X |

RICHARD C. QUEISSER, *Primary Examiner.*

DAVID SCHONBERG, *Examiner.*